United States Patent [19]

Kometani et al.

[11] 4,246,378

[45] Jan. 20, 1981

[54] THERMOPLASTIC POLYESTER RESINOUS COMPOSITION

[75] Inventors: Kiichi Kometani, Nagoya; Hotsuma Okasaka, Mishima, both of Japan

[73] Assignee: Toray Industries, Inc., Tokyo, Japan

[21] Appl. No.: 91,160

[22] Filed: Nov. 5, 1979

[30] Foreign Application Priority Data

Nov. 6, 1978 [JP] Japan ................................ 53-135733

[51] Int. Cl.$^3$ .................... C08F 283/00; C08F 283/02; C08G 63/76
[52] U.S. Cl. .................................. 525/438; 260/40 R; 525/4; 525/445; 528/293; 528/294; 528/295; 528/297
[58] Field of Search ............................ 525/438, 445, 4; 528/293, 294, 295, 297; 260/40 R

[56] References Cited

U.S. PATENT DOCUMENTS

| | | | |
|---|---|---|---|
| 3,985,825 | 10/1976 | Schmid et al. | 528/438 |
| 4,020,122 | 4/1977 | Borman et al. | 528/438 |
| 4,034,013 | 7/1977 | Lane | 525/4 X |
| 4,071,504 | 1/1978 | Korver | 528/297 X |
| 4,101,601 | 7/1978 | Thomas | 525/438 |

*Primary Examiner*—Lucille M. Phynes
*Attorney, Agent, or Firm*—Miller & Prestia

[57] ABSTRACT

A thermoplastic polyester resinous composition which comprises (a) a thermoplastic polyester, (b) an epoxy compound and (c) an organic sulfonate and/or organic sulfate salt, is disclosed. The polyester composition has excellent form stability in melt as well as beneficial mechanical properties such as impact strength. The composition can be molded to form various shaped articles by use of conventional molding methods.

10 Claims, No Drawings

THERMOPLASTIC POLYESTER RESINOUS COMPOSITION

The present invention relates to a thermoplastic polyester resinous composition and more particularly to a resinous composition having improved form stability in melt, improved thermal stability, and improved mechanical properties including impact strength.

Thermoplastic polyesters have been provided as molting resinous materials in various molding operations, for example injection molding, blow molding and extrusion molding. Especially in the case of shaping bottles by blow molding, and of tubes by extrusion molding, it is necessary that the molten resin (parison) maintain a uniform shape during processing, that is, it is required to have excellent form stability in melt. For the purpose of improving form stability in melt, it is required to impart both high melt viscosity and high melt strength to the polyester.

There have been many attempts to accomplish the above purpose. One method is to add a suitable chain extending agent such as an epoxy compound, by which the melt-stability of the polyester can be improved to some extent. By this method, however, it is not possible to improve the polyester to a satisfactorily high level in respect of both melt viscosity and melt strength. Therefore, the co-use of various compounds together with an epoxy compound has also been proposed in order to improve form stability in melt.

For example, the addition of an amine compound can highly improve the melt viscosity of a polyester, but at the same time the polyester composition tends to take on unwanted coloration. In Japanese patent publication (Kokai) No. 52-129,759, the addition of metal salts of mo carboxylic acid is proposed. Although the resulting color development is very small in these cases, any improvement in melt viscosity and melt-strength is so small as to be insufficient. Thus the methods heretofore proposed do not fulfill the above mentioned objectives, certainly not at a satisfactorily high level.

It is suggested that when thermoplastic polyester is subjected to injection molding, epoxy compounds can be added to the thermoplastic polyesters in order to improve their impact resistance, in particular, their notched Izod impact strength. In German patent publication No. 2,622,876, various copolymers comprising ethylene, unsaturated monomers containing the glycidyl group and other unsaturated monomers are proposed as such epoxy compounds. Japanese patent publication No. 52-32,045 also discloses copolymers comprising α-olefins, glycidyl methacrylates and vinyl acetate. Similarly, U.S. Pat. No. 4,034,013 discloses a multiple stage polymer having a rubbery first stage and an epoxy functional hard final stage.

In these cases, however, the improvement of the impact strength of the polyester is not sufficient to satisfy practical needs. Therefore, still further improvements are required.

Thus, an object of the present invention is to provide a thermoplastic polyester resinous composition which has excellent form stability in melt, and which also has excellent thermal stability.

Another object of the present invention is to provide a thermoplastic polyester resinous composition having improved impact strength.

We now have found that the addition of an organic sulfonate or an organic sulfate salt to a mixture of a polyester and an epoxy compound strikingly improves the form stability in melt and the mechanical properties as well, including impact strength.

The present invention relates to a thermoplastic polyester resinous composition which comprises, per 100 parts by weight of a thermoplastic polyester,
  a. from about 0.1 to 40 parts by weight of an epoxy compound and
  b. from about 0.001 to 10 parts by weight of at least one member selected from the group consisting of organic sulfonate salts and organic sulfate salts.

The main components of the thermoplastic polyesters employed in the practice of the present invention are polymers or copolymers prepared by condensing a dicarboxylic acid (or an ester forming compound thereof) with a glycol (or an ester forming compound thereof).

Among the dicarboxylic acids suitable for preparing polyesters in accordance with the present invention are the aromatic dicarboxylic acids such as terephthalic acid, isophthalic acid, orthophthalic acid, 2,6-naphthalene dicarboxylic acid, 1,5-naphthalene dicarboxylic acid, bis(p-carboxyphenyl) methane, anthracene dicarboxylic acid, 4,4-diphenylether dicarboxylic acid, aliphatic dicarboxylic acids such as adipic acid, sebacic acid, azelaic acid, cycloaliphatic dicarboxylic acids such as 1,3-cyclohexane dicarboxylic acid, 1,4-cyclohexane dicarboxylic acid and the like, or ester-forming compounds thereof.

The glycols suitable for preparing polyesters in accordance with the present invention include aliphatic diols having 2 to 10 carbon atoms such as ethylene glycol, 1,3-propylene glycol, 1,4-butanediol, neopentylglycol, 1,5-pentanediol, 1,6-hexanediol, decamethylene glycol, cyclohexanediol, long chain glycols having molecular weights on the order of about 400–6,000 such as poly(tetramethylene glycol), and the like. Mixtures of these glycols can also be employed.

Preferably polyesters are poly(ethylene terephthalate), poly(propylene terephthalate), poly(butylene terephthalate), poly(butylene sebacate), poly(ethylene 2,6-naphthalate), and the like. Among these poly(butylene terephthalate) is more preferably used because of its excellent mechanical properties.

The polyester of component (a) in this invention may preferably have a relative viscosity between 1.1 and 1.8 as measured in an o-chlorophenol solution of 0.5 wt.% concentration at 25° C. When the relative viscosity of the polyester is less than 1.1, the resinous composition does not exhibit sufficient form stability in melt. When the relative viscosity of the polyester is above 1.8, good surface gloss of the molded article cannot be obtained.

The second component (b) is defined as a compound possessing at least one epoxy group. The expoy compounds suitable for the present invention include bisphenol type epoxy compounds prepared by the reaction of bisphenol A with epichlorohydrin in various ratios, novolak type epoxy compounds prepared by reaction of novolak resins with epichlorohydrin, various types of polyglycidyl esters which can be prepared from polycarboxylic acids and epichlorohydrin, cycloaliphatic epoxy compounds which can be prepared by oxidation of cycloolefin compounds such as dicyclopentadiene, glycidyl ethers which can be prepared from aliphatic alcohols and epichlorohydrin, epoxidized polybutadiene, various copolymers containing epoxy groups prepared by copolymerization of unsaturated monomers containing epoxy groups and other unsaturated monomers, and the like. Preferred examples of the epoxy compounds are the bisphenol A type epoxy compounds represented by the following formula:

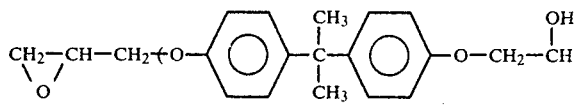 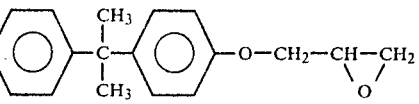

(where n is an integer from 0 to 20) and copolymers such as ethylene/glycidyl methacrylate, ethylene/vinyl acetate/glycidyl methacrylate, ethylene/carbon monoxide/glycidyl methacrylate, ethylene/glycidyl acrylate, and the like. Among the above epoxy compounds the one considered most suitable for the practice of this invention is ethylene/glycidyl methacrylate.

Epoxy compounds employed can be substituted with halogen atoms such as chlorine and bromine, while nitrogen containing epoxy compounds are less preferable because they tend to cause discoloration.

The amount of component (b) to be added is 0.1 to 40, preferably 1 to 30 parts by weight per 100 parts by weight of the thermoplastic polyester. When the amount of component (b) is too small, sufficient form stability in melt cannot be attained, while too much of this component imparts undesirable properties to the resulting composition.

The third component (c) is a compound selected from the group consisting of organic sulfonic acid salts and organic sulfate salts. These are represented by the general formulas:

$$R^3(SO_3M)_m$$

and $$R^4(OSO_3M)_{m'}$$

respectively. M may be a metal selected from the group consisting of alkali metals such as lithium, sodium and potassium, alkaline earth metals such as magnesium, calcium, strontium and barium, and other metals such as zinc and aluminum. M and m' represent the number of sulfonate and sulfate groups. When $R^3$ is a low molecular weight organic group, M is an integer from 1 to 3, preferably 1 or 2. When $R^3$ is polymeric or a high molecular weight organic group, M can be larger than above. Also, m' is an integer from 1 to 3, preferably 1 or 2.

$R^3$ may be an organic group including phenyl, α-naphthyl, β-naphthyl, dodecylphenyl, dodecylnaphthyl, allyl, methallyl, and the like. $R^3$ may also be a polymeric organic group having a high molecular weight such as poly(styrene). $R^4$ is alkyl or a poly-alkylene oxide group having about 10 to 30 carbon atoms which may be substituted by an aromatic group.

A preferable group of organic sulfonates is represented by the general formula:

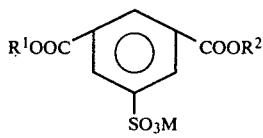

where M is the same as defined above; $R^1$ and $R^2$ are the same or different organic groups selected from methyl, ethyl, phenyl, 2-hydroxyethyl, and 4-hydroxybutyl groups. Another preferable group among the organic sulfonates is the alkyl benzene sulfonates wherein the alkyl group has about 10 to 30 carbon atoms. A typical example is sodium dodecylbenzene sulfonate.

Other concrete examples of organic sulfonates include sodium methallyl-sulfonate, potassium, 1,5-naphthalene-disulfonate, the condensed product of sodium naphthalene-sulfonate and formaldehyde, sodium salts of sulfonated poly(styrene), and the like.

Preferable organic sulfate salts include sodium laurylsulfonate, potassium laurylsulfate, calcium stearylsulfate, barium stearylsulfate, sodium poly(oxyethylene ethylethersulfate), sodium dodecylphenoxy polyoxyethylene-sulfonate and the like. More preferable members of components (c) are sodium 3,5-dicarbomethoxybenzenesulfate, potassium 3,5-dicarbomethoxybenzenesulfonate, and the like. More than two different components (c) can be used in the present invention.

Such members of the component (c) may be copolymerized with the polyester component (a).

The amount of component (c) is about 0.001 to 10, preferably 0.005 to 3 parts by weight per 100 parts by weight of the thermoplastic polyester. When the amount of component (c) is too small, sufficient form stability in melt cannot be attained. Even if too much of component (c) is used, desirable results corresponding thereto cannot be obtained.

If desired, the composition of the present invention may be subjected to addition of various additives such as fibrous or granular reinforcements and fillers including glass fibers, glass beads, carbon fibers, calcium carbonate, magnesium carbonates, barium sulfates, granular silicas, wollastonites, talcs, clays, micas, sericites, zeolites, bentonites, dolomites, kaolinites, asbestos, feldspars and the like; ultraviolet absorbents selected from various substituted benzotriazoles, benzophenones, salicylates, resorcinols and the like; lubricants and mold release agents selected from stearic acid, stearates, montanic acid, montan wax, montanates, stearyl alcohol, stearylamides such as ethylene bis(stearamide) and the like; coloring agents including dyes and pigments such as carbon black, titanium dioxide, cadmium sulfide and phthalocyanines; flame retardants selected from halogen substituted aromatic compounds such as decabromodiphenyl ether, brominated polycarbonates, melamine compounds, cyanuric acid derivatives, phosphorus compounds and the like; flame retarding assistants such as antimony trioxide and zirconium oxide; nucleating agents and antiwear agents and the like, insofar as the characteristics of the resulting compositions are not caused to deteriorate. More than two of the above mentioned additives can be used. Further, if desired, the composition of the present invention can be subjected to the addition of small amounts of other thermoplastic resins such as polyethylenes, polypropylenes, acrylic resins, fluorine-containing polymers, polyacetals, polycarbonates, polysulfones or polyphenyleneoxides, thermosetting resins such as phenolic resins, melamine resins, unsaturated polyester resins, silicone resins or epoxy resins, and elastomeric thermoplastic resins such as ethylene-vinylacetate-copolymers, ethylene-propylene-terpolymers, block-copolyetneresters and the like. More than two types of the above mentioned resins may be added.

Many methods may be used for preparing the resinous compositions of the present invention. Various conventional blending methods can be employed. The mixture of three components may preferably be accomplished by extrusion at a temperature above the melting point of the thermoplastic polyester. The resinous composition of the present invention can be molded according to conventional methods such as extrusion molding, blow molding, injection molding and the like.

The resinous composition of the present invention has excellent form stability in melt, and further has excellent mechanical properties including impact strength.

The present invention is illustrated below in detail with reference to Examples, but the Examples are by way of illustration and not by way of limitation.

In the illustrative Examples and Comparative Examples, the properties of the resinous composition are determined according to the following methods.

Melt viscosity:

Melt viscosity is measured with a Koka type flow tester at 250° C.

Melt strength:

At a temperature sufficient to keep the resin composition in a molten state (250° C. in the following Examples), the melt is extruded from the melt indexer under constant load. The time ($T_1$) necessary for extruding a strand length from the bottom of the cylinder of the melt indexer is measured. Continuously, the time (T) necessary for extruding 20 cm length of the same strand from the bottom of the melt indexer is measured. $T_2$ is defined as $T-T_1$. And the melt strength (MS) is defined as the ratio of $T_1$ to $T_2$ as in the following formula.

$$MS = \frac{T_1}{T_2}$$

It is preferable that the resin compositions subjected to extrusion molding have a melt strength within the range of about 1.0 to 2.0. Most preferably the melt strength value is 1.0, that is, the first 10 cm length of the strand is extruded at the same velocity as the second 10 cm length thereof. A resinous composition having a poor melt strength shows a value of $T_1/T_2$ has poor form stability in melt.

Izod strength:

Izod impact strength is determined according to ASTM D-256 by use of a notched Izod impact test piece ½ inch wide.

EXAMPLES 1-7 COMPARATIVE EXAMPLES 1-7

Resinous compositions were prepared each containing 100 parts by weight of a polyester having a relative viscosity of 1.61 which was produced by condensing terephthalic acid as the dicarboxylic acid constituent with 1,4-butanediol as the glycol constituent, proportions being illustrated in Table 1. The components were extruded in a screw extruder at a temperature of 250° C. and the extruded strands were pelletized. For comparison purposes, one composition (H) was made by omitting the epoxy compound and the organic sulfonate or the organic sulfate salt, three compositions (I–K) were made by omitting the epoxy compound, two compositions (L, M) were made by omitting the organic sulfonate or the organic sulfate salt, and one composition (N) was made by substituting the organic sulfonate or the organic sulfate salt for calcium stearate.

The results in terms of melt viscosities and melt strengths are illustrated in Table 1.

Subsequently, the pellets obtained were injection molded at 250° C. (mold: 80° C.) into ASTM D-256 type impact strength test pieces in a 5 oz. screw in-line type injection molding machine. The impact strengths obtained are illustrated in Table 1.

TABLE 1

| | Resin Composition | Epoxy compound | (parts by weight) | Organic Sulfate and Organic Sulfonate Salts | (parts by weight) | Melt Viscosity ($10^4$ poise) | Melt Strength | Notched Izod Impact Strength (Kg cm/cm) |
|---|---|---|---|---|---|---|---|---|
| A | Example 1 | "Epikote" 1001[a] | (3) | SSIA[d] | (0.1) | 2.5 | 1.6 | 3.6 |
| B | Example 2 | "Epikote" 1001[a] | (3) | SDBS[e] | (0.1) | 2.4 | 1.6 | 3.5 |
| C | Example 3 | "Epikote" 1001[a] | (3) | SLD[f] | (0.01) | 2.7 | 1.5 | 3.5 |
| D | Example 4 | E/GMA[b] | (10) | SSIA[d] | (0.05) | 3.4 | 1.5 | 9.0 |
| E | Example 5 | E/GMA[b] | (10) | CSIA[g] | (0.05) | 3.2 | 1.5 | 8.5 |
| F | Example 6 | E/GMA[b] | (10) | SDBS[e] | (0.05) | 3.1 | 1.5 | 8.7 |
| G | Example 7 | "BF-1000"[c] | (2) | SLS[f] | (0.01) | 2.8 | 1.7 | 4.0 |
| H | Comparative Example 1 | — | | — | | 1.1 | 3.1 | 2.9 |
| I | Comparative Example 2 | "Epikote" 1001[a] | (3) | — | | 1.2 | 3.1 | 3.0 |
| J | Comparative Example 3 | E/GMA[b] | (10) | — | | 1.6 | 2.4 | 4.5 |
| K | Comparative Example 4 | "BF-1000"[c] | (2) | — | | 1.0 | 3.3 | 3.3 |
| L | Comparative Example 5 | — | | SSIA[d] | (0.1) | 1.0 | 3.1 | 2.8 |
| M | Comparative Example 6 | — | | SDBS[e] | (0.1) | 1.0 | 3.1 | 2.8 |
| N | Comparative | E/GMA[b] | (10) | CST[h] | (0.1) | 1.7 | 2.4 | 4.5 |

TABLE 1-continued

| Resin Composition | Epoxy compound (parts by weight) | Organic Sulfate and Organic Sulfonate Salts (parts by weight) | Melt Viscosity ($10^4$ poise) | Melt Strength | Notched Izod Impact Strength (Kg cm/cm) |
|---|---|---|---|---|---|
| Example 7 | | | | | |

Notes:
[a] "Epikote" 1001; An epoxy compound of the glycidyl ether of bisphenol A type, molecular weight about 900, a product of Shell Company
[b] E/GMA; A copolymer of ethylene/ glycidyl methacrylate, about 90/10 ratio by weight, melt index 3.
[c] "BF-1000"; A epoxidized polybutadiene, molecular weight about 1000, a product of Adeka Argus Chemical Company
[d] SSIA;sodium 3,5-dicarbomethoxybenzenesulfonate
[e] SDBS; sodium dodecylbenzensulfonate
[f] SLS; sodium laurylsulfate
[g] CSIA; calcium 3,5-dicarbomethoxybenzenesulfonate
[g] CST; calcium stearate The data in Table 1 demonstrate that in comparison with the Comparative Examples, the compositions containing polyester, an epoxy compound, and a sulfonate or an organic sulfate have significantly higher melt viscosities and melt strengths. In addition, as is clear upon comparison of Examples 4 to 6 with Comparative Examples 3 and 8, compositions consisting of polyester, a copolymer containing epoxy groups and an organic sulfonate or an organic sulfate salt have excellent impact strengths.

EXAMPLES 8-14; COMPARATIVE EXAMPLES 8-14

The polyester resinous compositions prepared in Examples 1 to 7 were extruded through a crosshair die to form parisons of outer diameter 22 mm and thickness 2 mm. The melt was maintained at a temperature of 250° C. The parisons were blow molded into reagent bottles in a mold at about 80° C. The result of evaluation in respect to the states of parisons and blow molded bottles is illustrated in Table 2. In addition, the results obtained on the resins H to N are illustrated in Table 2.

TABLE 2

| | Resin Compositions | States of Parisons | States of Molded Bottles |
|---|---|---|---|
| Example 8 | A | no drawdown | good |
| Example 9 | B | no draw down | good |
| Example 10 | C | no drawdown | good |
| Example 11 | D | no drawdown | good |
| Example 12 | E | no drawdown | good |
| Example 13 | F | no drawdown | good |
| Example 14 | G | no drawdown | good |
| Comparative Example 8 | H | great drawdown | impossible to mold |
| Comparative Example 9 | I | great drawdown | impossible to mold |
| Comparative Example 10 | J | considerable drawdown | uneven in thickness |
| Comparative Example 11 | K | great drawdown | impossible to mold |
| Comparative Example 12 | L | great drawdown | impossible to mold |
| Comparative Example 13 | M | great drawdown | impossible to mold |
| Comparative Example 14 | N | considerable drawdown | uneven in thickness |

As is clear from Table 2, resinous compositions consisting essentially of a thermoplastic polyester, an epoxy compound, and an organic sulfonate or an organic sulfate salt have excellent properties for blow molding bottles.

EXAMPLE 15; COMPARATIVE EXAMPLES 15-17

A polyester resinous composition was prepared containing 100 parts by weight of a polyester having a relative viscosity of 1.54 which was produced by condensing terephthalic acid with 1,4-butanediol, 40 parts by weight of glass fibers (CS-3PE-231, a product of "Nitto Boseki Co. Ltd."), 10 parts by weight of E/GMA, and 0.02 parts by weight of SSIA. The component was extruded in a screw extruder at 250° C. and the extruded strands were pelletized. The pellets obtained were injection molded under the conditions of Examples 1 to 8 into ASTM D-256 type impact strength test pieces. For comparison purposes, three compositions were made omitting E/GMA and/or SSIA. The results are shown in Table 3.

TABLE 3

| | Additives (parts by weight) | | Notched Izod Impact Strength |
|---|---|---|---|
| | E/GMA | SSIA | (kg cm/cm) |
| Example 15 | 10 | 0.02 | 13.5 |
| Comparative Example 15 | — | — | 6.5 |
| Comparative Example 16 | 10 | — | 8.8 |
| Comparative Example 17 | — | 0.02 | 6.5 |

EXAMPLE 16; COMPARATIVE EXAMPLES 18-19

A polyester resinous composition was prepared containing 100 parts by weight of a polyester having a relative viscosity of 1.34 which was produced by condensing terephthalic acid with ethylene glycol, 40 parts by weight of glass fibers (CS-3PE-231, a product of "Nitto Boseki Co. Ltd."), 10 parts by weight of E/GMA, and 0.01 parts by weight of SSIA. The component was extruded and injection molded under the same conditions as Example 14, except that the setting temperature 280° C. (mold; 120° C.).

For comparison purposes, three compositions were made omitting E/GMA and/or SSIA. The test results are shown in Table 4.

TABLE 4

| | Additives (parts by weight) | | Notched Izod Impact Strength |
|---|---|---|---|
| | E/GMA | SSIA | (kg cm/cm) |
| Example 16 | 10 | 0.01 | 12.2 |

TABLE 4-continued

| | Additives (parts by weight) | | Notched Izod Impact Strength |
|---|---|---|---|
| | E/GMA | SSIA | (kg cm/cm) |
| Comparative Example 18 | — | — | 5.7 |
| Comparative Example 19 | 10 | — | 7.9 |
| Comparative Example 20 | — | 0.01 | 5.6 |

Compositions according to this invention, having good impact strengths are obtained.

We claim:

1. A thermoplastic polyester resinous composition which comprises, per 100 parts by weight of the thermoplastic polyester,
    (a) from about 0.1 to 40 parts by weight of an epoxy compound, and
    (b) from about 0.001 to 10 parts by weight of at least one member selected from the group consisting of organic sulfonates and organic sulfate salts.

2. A composition as defined in claim 1, wherein component (a) is poly(alkylene terephthalate).

3. A composition as defined in claim 2, wherein the poly(alkylene terephthalate) is poly(butylene terephthalate).

4. A composition as defined in claim 1, wherein the amount of the epoxy compound of component (b) is from about 1 to 30 parts by weight.

5. A composition as defined in claim 1, wherein the epoxy compound of component (a) is a copolymer containing epoxy groups selected from the group consisting of unsaturated monomers containing an epoxy group and other unsaturated monomers.

6. A composition as defined in claim 5, wherein the copolymer containing epoxy groups is an ethylene/glycidyl methacrylate copolymer.

7. A composition as defined in claim 1, wherein the organic sulfonate salt of the component (b) has the formula:

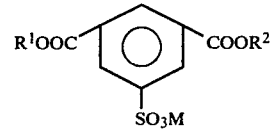

wherein M is a member selected from the group consisting of alkali metals, alkaline earth metals, zinc and aluminum; and wherein $R^1$ and $R^2$ are monovalent organic radicals selected from the group consisting of methyl, ethyl, phenyl, 2-hydroxyethyl and 4-hydroxybutyl.

8. A composition as defined in claim 1, wherein the organic sulfonate salt of the component (b) is an alkyl benzene sulfonate, wherein the alkyl group has 10 to 30 carbon atoms and wherein the salt contains a metal ion selected from the group consisting of the alkali metals, alkaline earth metals, zinc and aluminum.

9. A composition as defined in claim 6, further including fibrous and/or granular reinforcement.

10. A composition as defined in claim 8, wherein said reinforcement is a member selected from the group consisting of glass fiber, carbon fiber, wollastonite, talc, clay, glass bead and glass flake.

* * * * *

UNITED STATES PATENT AND TRADEMARK OFFICE
CERTIFICATE OF CORRECTION

PATENT NO. : 4,246,378
DATED : January 20, 1981
INVENTOR(S) : Kiichi Kometani et al It is certified that error appears in the above—identified patent and that said Letters Patent is hereby corrected as shown below:

Column 1, line 11, "molting" should read -- molding --.

Column 2, line 54, "expoy" should read -- epoxy --.

Table I, C Example 3, "$SLD^f$" should read -- $SLS^f$ --.

Signed and Sealed this

Fourteenth Day of April 1981

[SEAL]

Attest:

RENE D. TEGTMEYER

Attesting Officer   Acting Commissioner of Patents and Trademarks